Feb. 22, 1927.
K. L. HERRMANN
TESTING APPARATUS
Filed Sept. 10, 1923
1,618,965
2 Sheets-Sheet 2

INVENTOR
KARL L. HERRMANN
BY
*P. W. Pomeroy*
ATTORNEY

Patented Feb. 22, 1927.

1,618,965

UNITED STATES PATENT OFFICE.

KARL L. HERRMANN, OF DETROIT, MICHIGAN, ASSIGNOR TO THE STUDEBAKER CORPORATION, OF SOUTH BEND, INDIANA, A CORPORATION OF NEW JERSEY.

TESTING APPARATUS.

Application filed September 10, 1923. Serial No. 661,882.

This invention relates to devices for testing piston rings, and deals particularly with such devices used for testing the pressure exerted by piston rings on the walls of the cylinder adapted to receive the same.

The principal object of this invention is to provide such a device that will accurately and quickly show the variation of the pressure mentioned between all points on the surface of the piston under test and will be able to measure the pressure exerted at such points.

A further object is to provide mechanical means for bringing all points on the surface of the piston ring to be tested successively in contact with the pressure indicating means.

Still another object is to provide means for ejecting the piston rings after the same have been tested in said device, in order to facilitate and quicken the testing operation.

A further object is to provide a machine having rollers mounted thereon which are arranged in a circle so that the distance between the adjacent faces of the diametrically opposed rollers is exactly equal to the diameter of the cylinder in which the piston ring is used after testing.

Still a further object is to provide means which will indicate the variation of pressure exerted on the piston ring at one point, means to rotate the piston ring so that such variations may be registered on successive points of the piston ring, and means to eject the piston ring after the same has been tested.

Further objects, and objects relating to details of design and construction will be apparent in the following description, one of which is to provide a machine that is inexpensive to manufacture, simple in design and construction and easy to operate.

It is of great importance that the piston rings of internal combustion engines contact for their full length with the cylinders in which they are placed. Failure to do so may cause oil pumping or passage of lubricating oil into the combustion chamber, passage of raw fuel into the crankcase, thereby diluting the lubricant, uneven wear of the cylinder, and various other undesirable effects with their attendant troubles and dangers. It is further desirable that all points of the ring surface should exert equal pressures on the contacting cylinder wall, thus promoting even and uniform wear of both piston-ring and cylinder. In most cases a piston-ring that is not too far out-of-round when in compressed pisition, and which does not exert a too-varied pressure at the different points on its surface will eventually wear-in to the proper shape, but naturally causes trouble during the wearing-in stage. It is extremely difficult to detect such irregularities of a piston-ring with the eye and inasmuch as the proper fitting of piston-rings has much to do with the performance of the engines of which they form a part, it is necessary that the shape and pressure be checked up frequently in large production.

It is evident that if a piston-ring exerts equal pressure at all points of its surface on the contacting wall of its cylinder, its shape must be correct. Bearing this in mind, I have invented a device which will indicate variations of the pressure at all points on the surface of a piston-ring. With this device such variations of pressure can be determined quickly, easily, and economically, and experiments with different expanded shapes and sizes of piston-rings may be made to determine which will give the best results. Further, this device may be adapted to show the actual pressure at all points which the ring will exert on its cylinders.

In the accompanying drawings which illustrate a suitable embodiment of my present invention:

Figure 1:
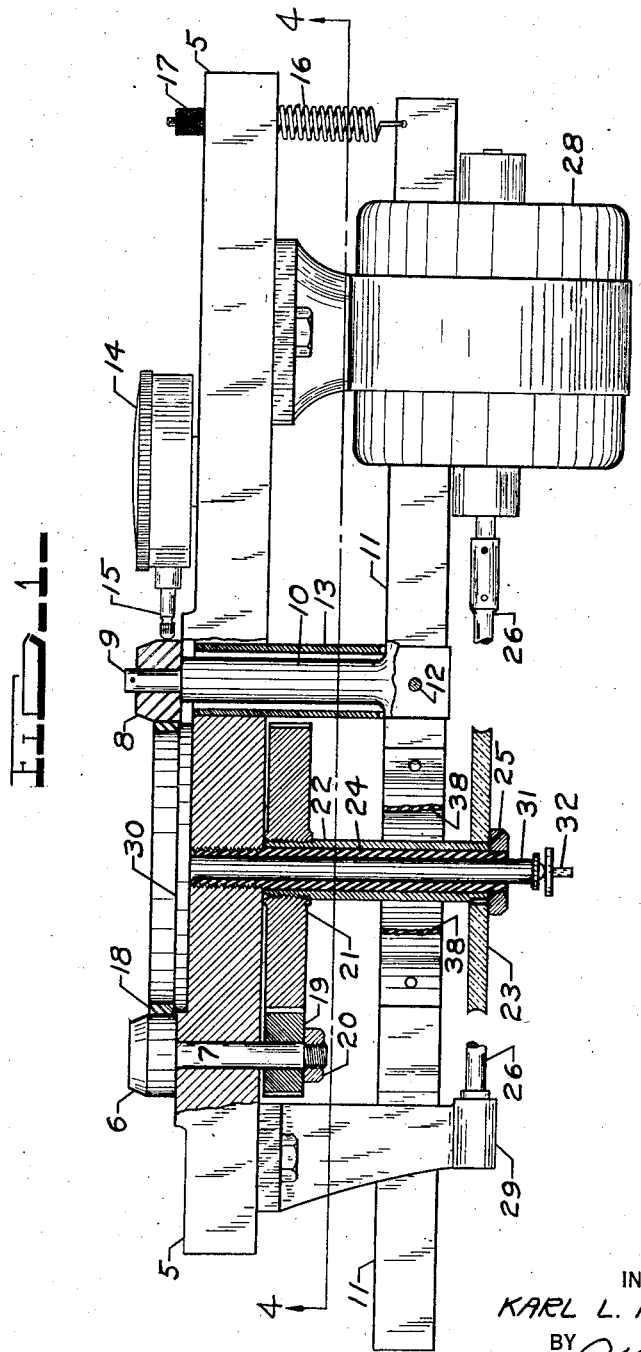
Figure 1 is a side elevation of the device certain parts being in section and, taken on the line 1—1 of Figure 2.
Figure 2:
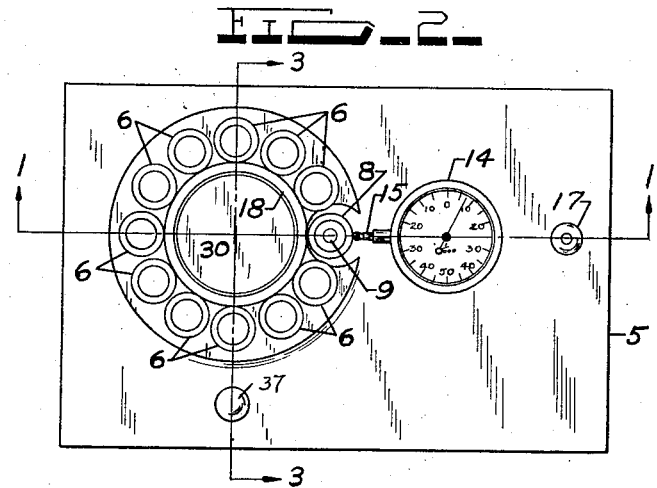
Figure 2 is a plan view of the device.
Figure 3:
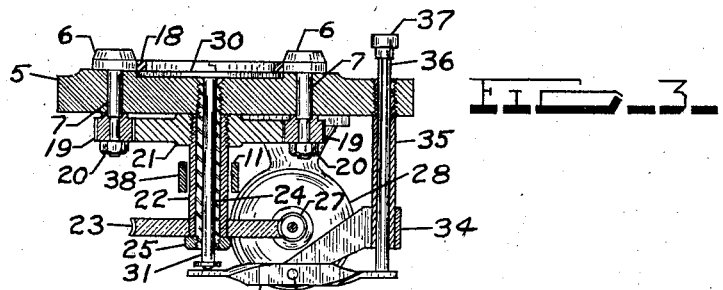
Figure 3 is a vertical sectional view of the device taken on the line 3—3 of Figure 2.
Figure 4:
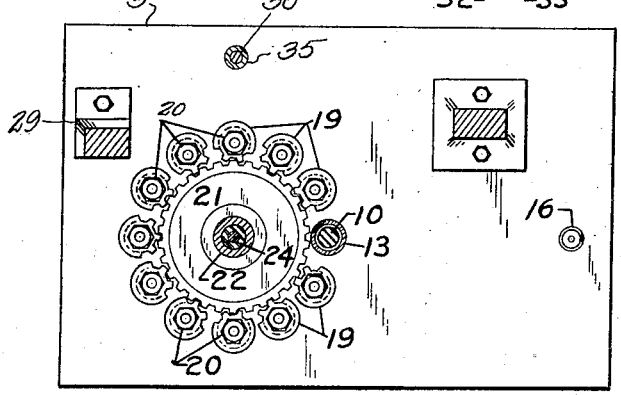
Figure 4 is a sectional view taken on the line 4—4 of Figure 1, showing the manner in which the rollers are geared together.

Referring to the numbered parts of the drawings, 5 is a plate member forming a base or support for the piston ring testing mechanism. Rollers 6, having depending shafts 7 extending through and bearing in the plate member 5, are arranged in a circle above the plate member 5, as shown, so that the distance between the adjacent faces of the diametrically opposed rollers 6 is exactly equal to the diameter of the cylinder in which the rings are adapted to fit. In other words, the inner faces of the rollers 6 approximate the inner surface of the engine cylinder. Obviously, the greater number of rollers the closer the approximation, the number shown being considered sufficient for practical uses, and I make no claim as to the number of rollers necessary to fall within the scope of this invention. One of the rollers 6, necessary to form a complete circle, is left out and in its place is substituted the roller 8, secured to and adapted to turn on the pin 9 of the member 10. The member 10 is rigidly fastened to a substantially horizontal bar member 11 which extends substantially the length of the plate member 5. The member 10 and bar 11 are pivoted at 12 to the member 13 which is secured to and depends from the plate member 5, the roller 8 being in a position corresponding to the rollers 6, but inasmuch as it is secured on the pin 9 of the member 10 pivoted at 12, it is capable of movement to or from the center of the circle formed by the inner faces of the rollers 6. A gage 14, mounted on the plate member 5, and having a projecting pin 15 bearing against the roller 8 is adapted to indicate the position of the roller 8 with respect to the circle formed by the inner faces of the rollers 6. A coil spring 16 is connected at its one end to the bar 11 and its opposite end terminates in a threaded portion which extends through the plate member 5, on which an adjusting nut 17 is threaded to vary the tension of the spring 16. The coil spring 16 tends to draw one end of the member towards the plate member 5, thereby tending to force the roller 8 towards the center of the circle of the rollers 6.

The features described, constitute one of the essential elements of my present invention and the operation is as follows. It is understood that the approximation of the circle formed by the adjacent faces of the diametrically opposite rollers 6, which are fixed as to position, is identical in diameter to the diameter of the cylinders in which the rings to be tested are to be placed. The gage 14 as shown merely indicates the position of the roller 8 in relation to this diameter, it being sufficient for ordinary purposes if the gage 14 reads in one one-thousandths of an inch. A plug, not shown, of exactly the same diameter as the diameter of the cylinder is placed within the rollers 6, the left hand end of the bar 11 being raised, thereby forcing the roller 8 away from the circle, to allow the plug to be inserted. The roller 8 is then allowed to return against the plug, being held in that position by the spring 16, the pressure of which does not materially effect the pressure transmitted by the piston-ring under test to the roller 8. The gage is then preferably set at zero reading, the plug removed and a piston-ring 18 to be tested is compressed and inserted in place of the plug. The tendency of the ring 18 to expand exerts a pressure on all the rollers in a degree commensurate with the pressure that the ring 18 will exert on the walls of the cylinder in which it is to be placed. The pressure thus exerted on the roller 8 will cause the same to recede from the circle formed by the inner faces of the rollers 6 and this movement will be indicated by the gage 14. The ring may then be rotated and each point on its surface be brought into contact with the roller 8, the pressure exerted by each of such points being indicated by the gage 14. Movement of the indicating needle of the gage 14 will indicate a variation of pressure of the ring 18 and therefore an unsatisfactory condition, and no movement of the gage 14 will indicate a perfect ring. As a rule this information is sufficient, and if the gage reads in one one-thousandths of an inch, experiments may be made to determine how many thousandths variation are permissible for satisfactory rings, and those rings exceeding this variation may be rejected as being unfit for use. In such a case it is not thought necessary to use a plug as described. If, on the other hand, it is desirable to determine the exact pressure in ounces exerted by the ring 18 on the walls of the cylinder in which it is to be placed, the gage 14 may be calibrated by well-known methods to give such readings.

In order to further expedite the operation of testing such rings 18, I have provided the other mechanism shown in the drawings. On the lower end of the depending shafts 7 of the rollers 6 I secure the small gears 19 by the nuts 20. Although the gears 19 shown in the drawings are represented with teeth on a portion only of their periphery, it is of course understood that these teeth extend entirely around the same. A large gear 21 located centrally with respect to the gears 19 meshes with all of them so that movement of the gear 21 causes an equal rotational movement of all the small gears 19. The large gear 21 is secured to a hollow shaft 22 and is adapted to rotate therewith. On the lower end of the shaft 22 is secured the worm-wheel 23 which is also adapted to rotate therewith. Another hollow shaft 24 centrally disposed with respect to the rollers 6, is threaded into the plate member 5 and depends therefrom and forms a bearing for the hollow shaft 22. A nut 25 at the lower end of the shaft 24 serves to hold the worm-wheel 23, shaft 22, and gear 21 in proper position. A horizontal shaft 26 having a worm 27 adapted to mesh with the worm-wheel 23 is driven by suitable means such as the electric motor 28, the end opposite the motor 28 being supported and bearing in the bracket 29 secured to and depending from the plate 5. Rotation of the motor 28 causes rotation of the worm-wheel 23, shaft 22, large gear 21, and therefore small gears 19. Inasmuch as the rollers 6 are secured to rotate with the gears 19, rotation of the motor 28 also causes rotation of the rollers 6, and therefore causes the piston-ring 18 to revolve, thus bringing each successive point of its outer surface in contact with the roller 8, the pressure exerted thereon being indicated by the gage 14. This means of mechanically rotating the ring 18 materially quickens the operation of testing and allows the operator of the device to give all his attention and efforts to watching the gage 14.

Another feature provided to further expedite the testing is means for throwing the ring 18 out of the rollers 6 when the test of the ring 18 has been completed. This is composed of the circular plate 30, of slightly smaller diameter than the circle formed by the inner faces of the rollers 6 and placed within the circle and adjacent the lower faces of the rollers 6. A depending shaft 31 is secured thereto and passed down through the center of the hollow shaft 24 and projects a slight distance below the lower end of the same. One end of a lever 32, pivoted at 33 to the bracket 34 secured to the hollow member 35 depending from the plate 5, bears against the projecting end of the shaft 31. The other end of the lever 32 bears against the pin 36 longitudinally movable within the hollow member 35, the pin 36 terminating above the plate 5 in a button 37. Downward pressure on the button 37 causes the plate 30 to be raised, also raising the ring 18 out of contact with the rollers 6, thus providing a quick ejecting mechanism for the rings, the weight of the plate 30 causing it to return to normal position when the pressure is taken off of the button 37. This feature materially shortens the time required to remove the ring 18 after it has been tested, thereby allowing a greater amount of rings to be tested in a given length of time.

The bar 11 is bent to clear the member 13 and a re-inforcing strip 38 is passed around the opposite side of the member 13 and secured to the bar 11.

Although I have shown rollers 6 placed to approximate a cylinder bore, it is only for ease of operation that I do so, it being readily understood that a ring of the same inside diameter having an opening of sufficient size for the roller 8 to work therein, could be substituted for the rollers 6 and the same result obtained.

While I have shown and described the rollers 6 as being in fixed relation to the piston ring 18, I wish it to be understood that I refer to the same as being in fixed relation when testing a given size of piston-ring. It is also understood that the rollers 6 and co-operating mechanism can be made adjustable and can be moved toward and from a given center and that the driving mechanism for the rollers can be altered to allow for such variation or adjustment. In the claims when I refer to the rollers as being in fixed relation to the piston-ring I refer to the same as being in position to test a given size ring and do not limit my invention to a testing device which is not adapted to test piston rings of varying sizes.

The rollers 6 allow the ring 18 to be rotated with a small degree of friction, and it is thus evident that I have provided a device that will quickly and accurately do the work specified.

Formal changes may be in the specific embodiment of the invention described, without departing from the spirit or substance of the broad invention the scope of which is commensurate with the appended claims.

What I claim is:

1. A device for testing piston rings comprising a support, means mounted thereon forming an approximation of a cylinder to receive a piston ring therein, said means having an opening in one side thereof, and a member mounted on said support extending into said opening and movable to and from said means an amount corresponding to the pressure exerted thereon by the piston ring being tested.

2. A device for testing piston rings comprising a support, means positioned thereon equidistant from a center forming an approximation of a cylinder bore to receive a piston ring, a member mounted on said support movable to and from said means an amount corresponding to the pressure exerted thereon by said piston ring, and a gage for indicating said movement.

3. A device for testing piston rings comprising a support, a plurality of members mounted thereon equidistant from a center to approximate a cylinder bore to receive a piston ring therein, a member adjustably supported by said support movable from said means by pressure exerted by the piston ring thereon, and means for indicating the movement of said movable member.

4. A device for testing piston rings comprising a support, a plurality of members mounted thereon equidistant from a given point to receive a piston ring therein, the faces of said members adjacent said point approximating the bore of a cylinder adapted to receive the piston ring being tested, and means for indicating the pressure of said piston ring against one of said members.

5. A device for testing piston rings comprising a support, a plurality of radially immovable rollers mounted in a circle thereon to receive a piston ring, the circle bounded by the inner faces of said rollers being of the same diameter as the cylinder receiving the piston ring being tested, a roller movable to and from said circle, and means for indicating the movement of said roller.

6. In a device for testing piston rings comprising a support, a plurality of rollers mounted in a circle on said support, the adjacent faces of the diametrically opposed rollers being spaced apart a distance equal to the diameter of the cylinder adapted to receive a piston ring to be tested by said device, one of said rollers being movable to and from the center of said circle, means for indicating said movement, and means comprising a plunger and a pivoted arm for ejecting a piston ring from said device.

7. A device for setting piston-rings, comprising a support, a plurality of independent members mounted thereon to receive a piston ring and to approximate the bore of a cylinder adapted to receive the piston-ring, one of said members being movable an amount proportionate to the pressure exerted thereon by the piston-ring inserted in said device; means for indicating the pressure exerted by said piston-ring on said member; and means for causing all points on the outer surface of said piston-ring to successively come in contact with said movable member.

8. A device for setting piston rings comprising a support, a plurality of independent members mounted thereon to receive a piston ring therein, said members being arranged to approximate the bore of a cylinder in which said piston ring is to be used, one of said members being movable in a radial direction in relation to said approximation of said cylinder bore an amount dependent on the pressure exerted by the piston ring on said member, a gage for determining said pressure, and means for causing each point on the periphery of said piston ring to successfully come in contact with said movable member.

9. A device for testing piston rings and the like comprising a support, a plurality of members rotatably mounted thereon to receive a piston ring, said members being arranged to approximate the bore of a cylinder in which the piston ring is to be used, one of said members being movable in relation to said approximation an amount corresponding to the pressure of the piston ring exerted thereon, means for indicating said pressure, means for rotating said members and piston ring, and means for ejecting the piston ring from said device.

10. In a device for testing piston rings comprising a plate, a plurality of rollers mounted in a circle on said plate, said rollers being arranged to approximate a cylinder bore with their inner surfaces, all of said rollers except one being permanently fixed in position, a lever pivoted below the plane of said rollers, said excepted roller mounted thereon, means for normally pressing said last named roller toward the center of said approximate bore, and means for gauging the position of said roller.

11. A device for testing piston rings comprising a plate, a plurality of shafts positioned relative to a given center rotatably mounted therein, rollers on said shafts to receive a piston ring, said rollers being positioned with their inner surfaces approximating the cylinder bore adapted to receive the piston ring being tested, gears mounted on said shafts, means for rotating said gears to thereby rotate said rollers and piston ring, a roller movable to and from said approximation of the cylinder bore by the pressure exerted thereon by the piston ring being rotated, and means for gaging the position of said movable roller.

12. A device for testing piston rings comprising a plate, a plurality of rollers rotatably mounted thereon to receive a piston ring with their inner faces approximating the cylinder bore to receive the piston ring, means to rotate said rollers, a roller movable to and from the approximation of said cylinder bore, a lever pivoted below the plane of said plate on which said movable roller is mounted, a manually operable means for moving said movable roller away from said bore approximation, resilient means for moving said roller toward said bore approximation, a gage to determine the position of said movable roller, and means to eject the piston ring from said device.

13. A device for testing piston-rings and the like comprising a plate, a plurality of shafts mounted therein, rollers on said shafts arranged to approximate a cylinder bore, all of said rollers with the exception of one being permanently positioned relative to a given center; gears on said shafts; a gear meshing with said gears on said shafts; and means for rotating the last mentioned gear.

14. A device for testing piston-rings and the like comprising a support, and means rotatably mounted thereon to approximate a cylinder bore, said means being in fixed position relative to said bore, and means to rotate said first means.

15. A device for testing piston-rings and the like comprising a support, a plurality of members mounted thereon to approximate a cylinder bore; one of said members being movable an amount corresponding to the pressure a piston-ring inserted in said bore approximation will exert thereon; means for indicating movement of the movable member; and means for ejecting a piston-ring from said bore approximation, comprising an ejector member extending under said ring, and means for raising said ejector member above the plane of the bore approximation members.

16. A device for testing piston-rings and the like comprising a plate, a plurality of rollers rotatably mounted in circular formation thereon, the faces of said rollers adjacent the center of said circular formation forming the approximation of a cylinder bore; all of said rollers with the exception of one being permanently fixed in position; and mechanical means for rotating the permanently fixed rollers whereby a piston-ring inserted in said bore approximation formed by their inner faces will be rotated.

17. In a device for testing piston rings, a support, a plurality of members rotatably mounted in circular formation on said support, the inner surfaces of said members being positioned to have pressure exerted thereon by the piston ring, means to indicate the pressure of the piston ring on said members and means to rotate said members.

18. In a device for testing piston rings, a support, a plurality of members rotatably mounted in circular formation on said support, said members being positioned to have pressure exerted thereon by the piston ring, means to indicate the pressure of the piston ring on said members, means to rotate said members and means to eject the piston ring from said device.

Signed by me at Detroit, Michigan, U. S. A., this 6th day of September, 1923.

KARL L. HERRMANN.

Certificate of Correction

Patent No. 1,618,965.                    Granted February 22, 1927, to

KARL L. HERRMANN.

It is hereby certified that error appears in the printed specification of the above-numbered patent requiring correction as follows: Page 4, lines 13 and 27, claims 7 and 8, respectively, for the word " setting " read *testing;* and that the said Letters Patent should be read with these corrections therein that the same may conform to the record of the case in the Patent Office.

Signed and sealed this 29th day of March, A. D. 1927.

[SEAL.]
M. J. MOORE,
*Acting Commissioner of Patents.*